United States Patent
Kohlbock et al.

(10) Patent No.: US 9,845,834 B2
(45) Date of Patent: Dec. 19, 2017

(54) POSITIVE-LOCKING CLUTCH

(71) Applicant: MAGNA Powertrain AG & Co KG, Lannach (AT)

(72) Inventors: Markus Kohlbock, Ottnang a. H. (AT); Daniel Prix, Ebental (AT); Dominik Schober, Graz (AT); David Willam, Graz (AT)

(73) Assignee: MAGNA POWERTRAIN AG & CO KG, Lannach (AT)

( * ) Notice: Subject to any disclaimer, the term of this patent is extended or adjusted under 35 U.S.C. 154(b) by 65 days.

(21) Appl. No.: 14/364,852

(22) PCT Filed: Nov. 27, 2012

(86) PCT No.: PCT/EP2012/073723
§ 371 (c)(1),
(2) Date: Jun. 12, 2014

(87) PCT Pub. No.: WO2013/092128
PCT Pub. Date: Jun. 27, 2013

(65) Prior Publication Data
US 2014/0342874 A1   Nov. 20, 2014

(30) Foreign Application Priority Data
Dec. 21, 2011  (DE) .......................... 10 2011 056 820

(51) Int. Cl.
*F16D 27/09* (2006.01)
*F16D 27/118* (2006.01)
(Continued)

(52) U.S. Cl.
CPC ............. *F16D 27/09* (2013.01); *B60W 10/02* (2013.01); *B60W 10/08* (2013.01);
(Continued)

(58) Field of Classification Search
CPC .................. F16D 27/09; F16D 27/118; F16D 2500/10462; F16D 2500/30408;
(Continued)

(56) References Cited

U.S. PATENT DOCUMENTS 5,078,229 A * 1/1992 Kikuchi ................. B60K 17/08
                                                        180/248
5,827,148 A * 10/1998 Seto ..................... B60W 30/1819
                                                        477/15
(Continued)

FOREIGN PATENT DOCUMENTS

CN   1373840 A   10/2002
DE   3446430 A1   7/1986
(Continued)

OTHER PUBLICATIONS

Definition of Tappet, retrieved on Feb. 2, 2016 from http://www.merriam-webster.com/dictionary/tappet.*
(Continued)

*Primary Examiner* — Stacey Fluhart
(74) *Attorney, Agent, or Firm* — Dickinson Wright PLLC (57) ABSTRACT

A positive-locking clutch for a motor vehicle comprises a coupling element with a toothing, a rotatable counterpart element with a counterpart toothing, and an electromagnetic actuator. The coupling element can be moved by means of the electromagnetic actuator between a disengaged position and an engaged position, and wherein the toothing of the coupling element is meshed with the counterpart toothing of the counterpart element in the engaged position. Even after the engaged position of the coupling element has been fully reached, a backlash is provided between the toothing of the coupling element and the counterpart toothing of the counterpart element.

13 Claims, 4 Drawing Sheets

(51) Int. Cl.
*F16D 48/06* (2006.01)
*B60W 10/02* (2006.01)
*B60W 10/08* (2006.01)

(52) U.S. Cl.
CPC .......... *F16D 27/118* (2013.01); *F16D 48/064* (2013.01); *F16D 2500/10462* (2013.01); *F16D 2500/30408* (2013.01); *F16D 2500/50607* (2013.01); *Y10T 477/327* (2015.01)

(58) Field of Classification Search
CPC ... F16D 2500/50607; F16D 2500/5061; F16D 2023/141; B60W 10/02; B60W 10/08; Y10T 477/327; F16H 1/205
USPC .............................................. 192/99 A, 84.4
See application file for complete search history.

(56) References Cited

U.S. PATENT DOCUMENTS

| | | | |
|---|---|---|---|
| 7,896,147 B2 | 3/2011 | Burke et al. | |
| 8,042,642 B2 | 10/2011 | Marsh et al. | |
| 2002/0019284 A1* | 2/2002 | Aikawa | B60K 1/00 475/150 |
| 2004/0124058 A1* | 7/2004 | Fujiu | F16D 27/118 192/84.92 |
| 2005/0247503 A1* | 11/2005 | Imazu | B60K 6/445 180/300 |
| 2006/0037831 A1* | 2/2006 | Grillo | F16D 23/14 192/99 S |
| 2007/0135260 A1* | 6/2007 | Bianchi | B60K 17/28 477/72 |
| 2007/0240956 A1* | 10/2007 | Minami | B60W 10/02 192/3.63 |
| 2009/0224728 A1* | 9/2009 | Burke | F16D 27/118 322/41 |
| 2010/0276245 A1* | 11/2010 | Umeno | F16D 11/10 192/69.81 |
| 2012/0109474 A1* | 5/2012 | Morris | B60W 10/08 701/54 |
| 2012/0291580 A1* | 11/2012 | Kim | F16D 23/12 74/473.12 |
| 2012/0298898 A1* | 11/2012 | Scherer | G05D 16/2033 251/129.15 |
| 2013/0075224 A1* | 3/2013 | Hirsch | F16D 23/14 192/99 R |

FOREIGN PATENT DOCUMENTS

| | | |
|---|---|---|
| DE | 102008054635 A1 | 6/2010 |
| FR | 2905437 A1 | 3/2008 |
| FR | 2912484 A1 | 8/2008 |
| FR | 2913225 A1 | 9/2008 |
| GB | 721910 A | 1/1955 |
| WO | WO2011064364 A1 | 6/2011 |

OTHER PUBLICATIONS

Search Report dated Oct. 27, 2015 in corresponding Chinese Patent Application No. 2012800640562.

* cited by examiner

Fig. 4b

POSITIVE-LOCKING CLUTCH

CROSS-REFERENCE TO RELATED APPLICATIONS

This application is a U.S. National Stage of International Application No. PCT/EP2012/073723 filed Nov. 27, 2012 and which claims the benefit of and priority to German Application No. DE102011056820.4 filed Dec. 21, 2011. The entire disclosure of each of the above applications is incorporated herein by reference.

TECHNICAL FIELD

The invention concerns a positive-locking clutch for a motor vehicle, which comprises a coupling element with a toothing, a rotatable counterpart element with a counterpart toothing, and an electromagnetic actuator, wherein the coupling element can be moved by means of the electromagnetic actuator between a disengaged position and an engaged position, and wherein the toothing of the coupling element is meshed with the counterpart toothing of the counterpart element in the engaged position. The invention furthermore concerns a drive train of a motor vehicle with such a clutch.

BACKGROUND

Motor vehicles with hybrid drive are known in which a drive axle is driven by an internal combustion engine, while another drive axle can be driven by an electric motor. The motor vehicle is not normally driven permanently by the electric motor but selectively, and adapted to the driving situation. Typically, the electric motor drive is engaged under acceleration, in particular from a standstill, when climbing and in particularly dynamic driving situations, whereas at continuous speed the motor vehicle is driven substantially by the internal combustion engine. The correspondingly adapted, selective addition of an electric motor drive as a whole allows an increase in efficiency of the drive.

In order to couple an electric motor, as a drive of a motor vehicle with hybrid drive, with the drive axle to be driven thereby, or to separate this from the drive axle, clutches can be used which selectively transmit torque output by the electric motor to the drive axle. These are usually positive-locking clutches in which an input-side clutch element and an output-side clutch element intermesh via toothings. When such a clutch is closed, for friction-free operation it must be ensured that a possible tooth-to-tooth positioning of the toothings to be connected can be overcome by a suitable mechanism. When the clutch is opened during driving, when therefore the toothings of the coupled clutch elements intermesh, the difficulty arises that the torques transmitted between the clutch elements must prevent mutual separation of the clutch elements and that therefore a correspondingly high force must be applied.

Clutches for selective separation of an electric motor from a drive axle of a motor vehicle may for example be electromechanical in type, i.e. the clutch has its own electric motor with reduction gear mechanism which can be operated as an actuator to adjust the clutch. With corresponding configuration, the power of such an electric motor is sufficient to move the clutch from the closed to the open state even under substantial torques transmitted between the clutch elements. However such a design of a clutch requires a relatively large construction space and also has a high power requirement.

Clutches are also known which are moveable by electromagnetic actuators. In a hybrid drive of the type described, such clutches can be arranged on the output side of a gear mechanism active between the electric motor and the drive axle. This however has the consequence that the capacity of the clutch must be designed for the possibly high torque values which can occur at the drive axle.

SUMMARY

An object of the invention is therefore to provide a compact and efficient clutch for selective torque transmission, in particular from an electric motor to a drive axle of a motor vehicle, which can be opened and closed particularly easily, in particular also during driving.

This object is achieved by a positive-locking clutch for a motor vehicle, which comprises a coupling element with a toothing, a rotatable counterpart element with a counterpart toothing, and an electromagnetic actuator, wherein the coupling element can be moved by means of the electromagnetic actuator between a disengaged position and an engaged position, and wherein the toothing of the coupling element is meshed with the counterpart toothing of the counterpart element in the engaged position, wherein even after the engaged position of the coupling element has been fully reached, a backlash is provided between the toothing of the coupling element and the counterpart toothing of the counterpart element.

In the clutch in accordance with the invention, the presence of a backlash between the intermeshing toothings of the elements to be coupled is not undesirable, as is usually the case, but rather intended. The presence of a significant backlash means that even when the coupling element is in the engaged position and hence meshed with the counterpart element, the coupling element and the counterpart element have a certain relative freedom of movement in the rotation direction, i.e. about the rotation axis of the clutch. Such a backlash is achieved for example when the teeth of the toothing of the coupling element and the teeth of the counterpart toothing of the counterpart element are configured such that a degree of play is present between the two flanks in the direction of rotation (so-called circumferential backlash). The backlash provided intentionally helps overcome a tooth-to-tooth positioning, in which the two toothings to be brought into engagement with each other are oriented in relation to their relative angular positions such that the teeth of the one toothing would impact on the teeth of the other toothing on engagement. Only by adjusting the relative angular positions of the toothings is such a tooth-to-tooth positioning eliminated.

The greater the backlash between the toothings to be connected, the smaller the necessary adaptation of the relative angular positions required, and the easier it is to close the clutch. For this reason, because of the backlash present, it is sufficient to apply merely small forces to shift the coupling elements into the engaged position. A large backlash can also reduce the axial friction forces acting between the toothings. This further facilitates the clutch opening. In particular the opening and closing of the clutch even during driving are facilitated in this way.

Advantageous embodiments of the invention are described in the dependent claims and below.

Preferably the coupling element of the clutch is moveable in the axial direction relative to the counterpart element, wherein the toothing of the coupling element is directed radially inward and the counterpart toothing of the counterpart element is directed radially outward, or vice versa. For example said coupling element can be an internal ring gear in the form of a sliding sleeve with inner toothing which can be arranged axially moveably on a shaft or on a gear wheel. The counterpart element to be coupled can accordingly be formed as a counterpart toothing with outer toothing, in the manner of a spur gear toothing, to which the inner toothing of the coupling element can be selectively coupled by axial movement of the coupling element. The intermeshing of the inner toothing of the coupling element and outer toothing of the counterpart element then takes place in the manner of a push-fit toothing or fit toothing, but with backlash between the two toothings. In the reverse case which is also possible, the coupling element has an outer toothing and the counterpart element an inner toothing, with backlash between the toothings.

In an alternative embodiment in which the clutch is designed as a claw clutch, the coupling element has toothing on an axial face e.g. in the manner of a crown gear wheel, which corresponds to counterpart toothing on an axial face of the counterpart element to be coupled and which can be brought into rotationally fixed engagement with this counterpart toothing.

In accordance with a preferred embodiment, the coupling element of the clutch is mounted on a rotatable carrier element to be axially moveable but rotationally stationary and play-free.

The coupling element of the clutch can be moved between said disengaged position and said engaged position by means of said electromagnetic actuator of the clutch. The use of an electromagnetic actuator ensures a simple and reliable actuation of the coupling element. Preferably the electromagnetic actuator has an moveable tappet for actuating the clutch, and also a pretension device which pretensions the tappet in the direction of the clutch open position. This clutch open position corresponds to said disengaged position of the coupling element. Said pretension device may be a compression spring in the form of a coil spring, an mondular washer or other spring.

In a refinement of this embodiment, the electromagnetic actuator can comprise an electromagnet which for example is formed as a coil, and an armature, wherein the armature is linearly moveable in the electromagnet under interaction with a possible electromagnetic field of the electromagnet. To actuate the clutch, said tappet can be coupled to the armature of the electromagnet, wherein the tappet can be arranged axially moveably at least partly within the coil. Since the pretension device pretensions the tappet in the direction of a clutch open position, it is advantageous if the electromagnet of the actuator is operated poled only in the direction which causes a movement of the tappet in the direction of a clutch closed position, i.e. in the direction of the engaged position of the coupling element. The pretension device then consequently works directly against the effect of any electromagnetic force present from the electromagnet. Operation of the electromagnet by a correspondingly poled power supply then causes a movement of the clutch in the direction of the closed position, while disconnection of the electromagnet causes an unpowered movement of the clutch in the direction of the open position. Only friction forces then hinder the opening of the clutch, in particular the friction between the toothings to be separated from each other. In an unloaded state in which no torque is transmitted between the toothings, the clutch can thus be moved unpowered and automatically into the open position.

Preferably the positive-locking clutch is part of a drive train for a motor vehicle which can also comprise an electric motor and a control device, wherein the control device is adapted to control the electric motor, and the electric motor can drive the counterpart element or coupling element in a rotational movement. In this way the control device can bring the rotation speed of the counterpart element closer to the rotation speed of the coupling element while retaining a slight rotation speed difference, which as explained below is essential for overcoming a tooth-to-tooth positioning when closing the clutch.

In an advantageous embodiment, at least one rotation speed sensor is associated with the counterpart element to generate a rotation speed signal, and at least one rotation speed sensor is associated with the coupling element to generate a further rotation speed signal. The rotation speed sensors need not be arranged directly on the counterpart element or coupling element. They can also be arranged on another element which is connected with drive effect to the counterpart element or coupling element, as long as the translation ratio between this other element and the counterpart element or coupling element is known. Then the respective rotation speed of the counterpart element or coupling element can be determined from the rotation speed signal measured by the respective rotation speed sensor.

If for example the counterpart element is connected with drive effect to the electric motor of the drive train, the at least one rotation speed sensor associated with the counterpart element can be arranged on the electric motor (e.g. as an integrated Hall sensor). If for example the coupling element is connected with drive effect to a main gear mechanism, the at least one rotation speed sensor associated with the coupling element can be arranged on the main gear mechanism. If the main gear mechanism e.g. is an axle differential, via which two wheels of an axle are driven, the at least one rotation speed sensor associated with the coupling element can also comprise the two wheel rotation speed sensors, which are typically present in any case on the wheels of the axle concerned (e.g. for an anti-lock brake system, ABS). Then the rotation speed at the axle differential and at the coupling element can be calculated from the two rotation speed signals measured at the wheels. Said example applies in reverse if the counterpart element and coupling element are exchanged.

Furthermore the control device of the drive train is preferably suitable for controlling the electromagnetic actuator and/or the electric motor as a function of the two rotation speed signals. So that the movement of the clutch into the closed position can achieve a coupling of the two toothings (toothing of coupling element and counterpart toothing of counterpart element), it is necessary for the respective teeth of the one toothing to meet respective gaps of the other toothing. If the motor vehicle is in motion at the time of movement of the clutch, all elements drive-connected to the wheels and located between the wheels and the clutch will rotate because of the rotation of the vehicle wheels, while the electric motor and all elements drive-connected to the electric motor and located between the electric motor and the clutch are at a standstill or can execute any arbitrary rotation. The clutch can only close if the clutch elements to be coupled directly together, i.e. the coupling element and the counterpart element, have a rotation speed difference which does not exceed a specific value dependent on the size of the clutch elements. The control device which receives and/or calculates the rotation speed signals associated with the coupling element and counterpart element, from the corresponding rotation speed sensors, can calculate from these the rotation speed difference between the clutch elements to be coupled. From this rotation speed difference, the control device can adapt the rotation speed of the electric motor for the clutch process in order to bring the calculated rotation speed difference close to the value of zero.

Preferably the control device is adapted to control the actuator so that only in the presence of a suitable rotation speed difference can the clutch elements to be coupled be brought into engagement with each other. In this way a reliable coupling of the clutch elements can be guaranteed even in rotating state without requiring the use of mechanical synchronisation devices.

Preferably the clutch comprises a position sensor which is adapted to detect the position of the coupling element and generate a corresponding position signal. The control device of the drive train is preferably adapted to control the electromagnetic actuator and/or the electric motor as a function of the position signal from the position sensor. The control device can thus detect the position of the coupling element and can control and consequently regulate this precisely via the electromagnetic actuator. Also, for example after detecting the disengaged position of the coupling element, the control device can cause a slow down or other adaptation of the electric motor in order for example to save energy.

In a particularly preferred embodiment, a control device is provided which controls both the electromagnetic actuator and the electric motor as a function both of the rotation speed signals from the rotation speed sensors and of the position signal from the position sensor. Such a control device is particularly suitable for controlling all processes of movement of the clutch between the disengaged position and the engaged position of the coupling element, in both directions.

If for example the coupling element is to be moved from the disengaged position to the engaged position, the control device can initially suitably reduce the rotation speed difference of the elements to be coupled, by controlling the electric motor. If the control device detects the presence of a suitable rotation speed difference from the rotation speed signals, it can command the electromagnetic actuator to move the coupling element from the disengaged position to the engaged position. When the coupling element reaches the engaged position, this is reported to the control device via the position signal of the position sensor, whereupon the control device for example controls the electromagnetic actuator from a movement actuation into a pure holding actuation in which comparatively little current need be consumed.

Similarly, if the coupling element is to be moved from the engaged position to the disengaged position, the control device can control a complex process: for example, in order to reduce the axial forces necessary to open the clutch, the control device can provoke a load change in that the rotation speed of the electric motor is reduced or increased accordingly. The backlash present between the toothing of the coupling element and the counterpart toothing of the counterpart element then quickly ensures a reduction in the axial friction forces acting between these coupled elements, so that the force applied by the pretension device of the electromagnetic actuator can separate the coupled elements from each other. When the coupling element reaches the disengaged position, the control device is informed of this by the position signal of the position sensor, whereupon the control device can bring the electric motor to a standstill for example.

In an advantageous embodiment, the drive train comprises a main gear mechanism and an intermediate gear mechanism arranged between the electric motor and the main gear mechanism, wherein the electric motor has an output element and the main gear mechanism has an input element. The intermediate gear mechanism preferably comprises a first gear wheel which is coupled rotationally fixedly or with drive effect to the output element of the electric motor, a second gear wheel which intermeshes with the first gear wheel, a third gear wheel, a fourth gear wheel which intermeshes with the third gear wheel and is coupled rotationally fixedly or with drive effect to the input element of the main gear mechanism, and an intermediate shaft. Advantageously, the one of the second and third gear wheels is coupled rotationally fixedly to the intermediate shaft, and the other of the second and third gear wheels is mounted rotatably on the intermediate shaft, wherein by means of the positive-locking clutch, the second of the second and third gear wheels can be coupled rotationally fixedly to the intermediate shaft.

In such an advantageous drive train in which torque is output by an electric motor and transmitted to a main gear mechanism, the clutch, via which the electric motor can be engaged or disengaged as a drive of the motor vehicle, is located in an intermediate gear mechanism arranged between the electric motor and the main gear mechanism. This intermediate gear mechanism allows the adaptation of the torque and rotation speeds output by the electric motor. For this the intermediate gear mechanism comprises at least one intermediate shaft on which two gear wheels are mounted (second and third gear wheels), and at least two further gear wheels (first and fourth gear wheels), which each intermesh with one of the gear wheels on the intermediate shaft. The first gear wheel is coupled rotationally fixedly or with drive effect to the output element of the electric motor, and the fourth gear wheel is coupled rotationally fixedly or with drive effect to the input element of the main gear mechanism. The output element of the electric motor, the input shaft of the intermediate gear mechanism and the input element of the main gear mechanism can thus be coaxial to each other in pairs but however radially offset. Of the two gear wheels mounted on the intermediate shaft, the one is coupled rotationally fixedly to the intermediate shaft (fixed gear wheel), while the other is mounted rotatably on the intermediate shaft (moveable gear wheel).

The electric motor is drive-connected to the main gear mechanism in accordance with said embodiment by the rotationally stationary coupling of the moveable gear wheel on the intermediate shaft by means of the positive-locking clutch. The arrangement of the clutch on an intermediate shaft of the gear mechanism thus allows a compact construction of the intermediate gear mechanism and clutch. Because the clutch is arranged on an intermediate shaft of the intermediate gear mechanism, and not at the output of the intermediate gear mechanism to the main gear mechanism, the capacity of the clutch need furthermore not be designed for the torques effective at the main gear mechanism and the further elements drive-connected thereto as far as the drive axles, but merely for the torques effective at the intermediate shaft of the intermediate gear mechanism. In the preferred case of a design of the intermediate gear mechanism as a reduction gear, the arrangement of the clutch on the intermediate shaft therefore means that the clutch need only meet lower requirements. The clutch can be actuated via the electromagnetic actuator, the power requirements of which can be kept low and which does not hinder a compact construction of the clutch and intermediate gear mechanism.

Preferably the coupling element of the clutch (for example a sliding sleeve) is mounted rotationally fixedly on the intermediate shaft of the intermediate gear mechanism but axially moveably between the disengaged position and the engaged position. The intermediate shaft in this embodiment forms said carrier element for the coupling element. The counterpart element of the clutch can be formed by said other of the second and third gear wheels of the intermediate gear mechanism, i.e. by said moveable gear wheel. The toothing of the coupling element rotating with the intermediate shaft in this embodiment, in its engaged position, intermeshes with the counterpart toothing of the moveable gear wheel mounted on the intermediate shaft. In this way the moveable gear wheel is coupled rotationally fixedly to the intermediate shaft, wherein a backlash is provided between the toothings. The rotationally stationary coupling of the moveable gear wheel with the intermediate shaft here corresponds to a drive connection of the electric motor with the main gear mechanism of the drive train. Conversely thus a position of the coupling element in the disengaged position means a separation of the drive connection of the electric motor and main gear mechanism, because in the disengaged position the moveable gear wheel is again mounted freely rotatably on the intermediate shaft.

In an advantageous embodiment, the main gear mechanism of the drive train is an axle differential.

Preferably the intermediate gear mechanism is provided for setting the rotation speed of the input element of the main gear mechanism more slowly relative to the rotation speed of the output element of the electric motor, when said other of the second and third gear wheels is coupled rotationally fixedly to the intermediate shaft by the clutch. The intermediate gear mechanism arranged between the electric motor and the main gear mechanism is therefore preferably a reduction gear, which translates the high rotation speeds of the electric motor into lower rotation speeds of the main gear mechanism. In this way it is possible for an electric motor to provide the desired high torques to drive the motor vehicle at the input shaft of the main gear mechanism.

DRAWINGS

The invention is now explained below merely as an example with reference to the drawings.

DESCRIPTION

Figure 1:
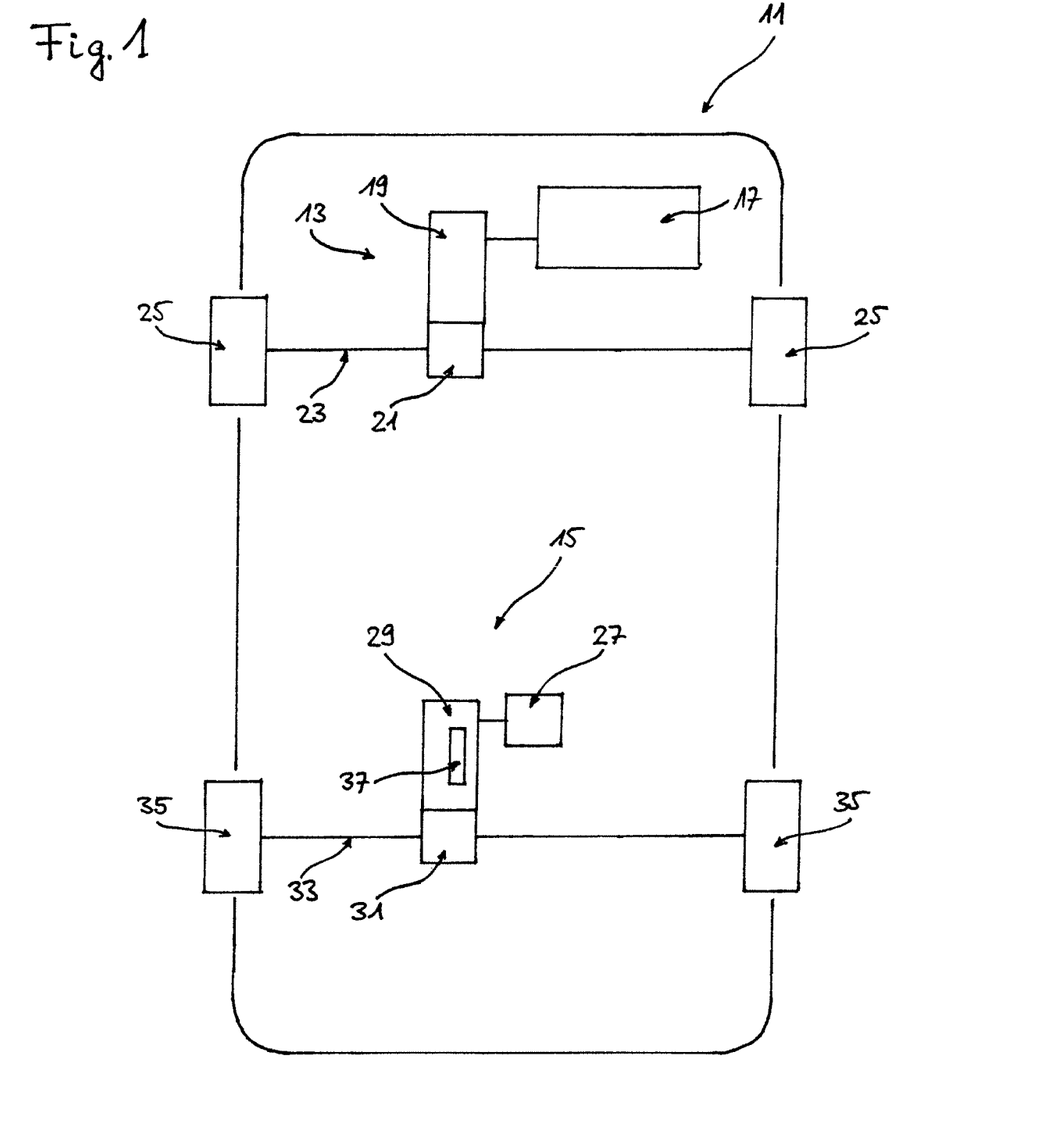
FIG. 1 illustrates a diagrammatic depiction of a motor vehicle with two drive trains.

FIG. 1 illustrates a motor vehicle 11 in a diagrammatic depiction. The motor vehicle 11 has two drive trains 13, 15, of which the one drive train 13 has as a drive device an internal combustion engine 17 which drives an axle 23 with wheels 25 via a manual gear mechanism 19 and an axle differential 21. In the embodiment shown here, the axle 23 is the front axle of the motor vehicle 11. The other drive train 15 comprises as a drive device an electric motor 27 which is connected to an intermediate gear mechanism 29. The intermediate gear mechanism 29 is connected on the output side to an axle differential 31, which forms a main gear mechanism for the drive train 15 and can transmit the torque to the axle 33 and the wheels 35. A clutch 37 is also arranged in the intermediate gear mechanism 29.

Figure 2:
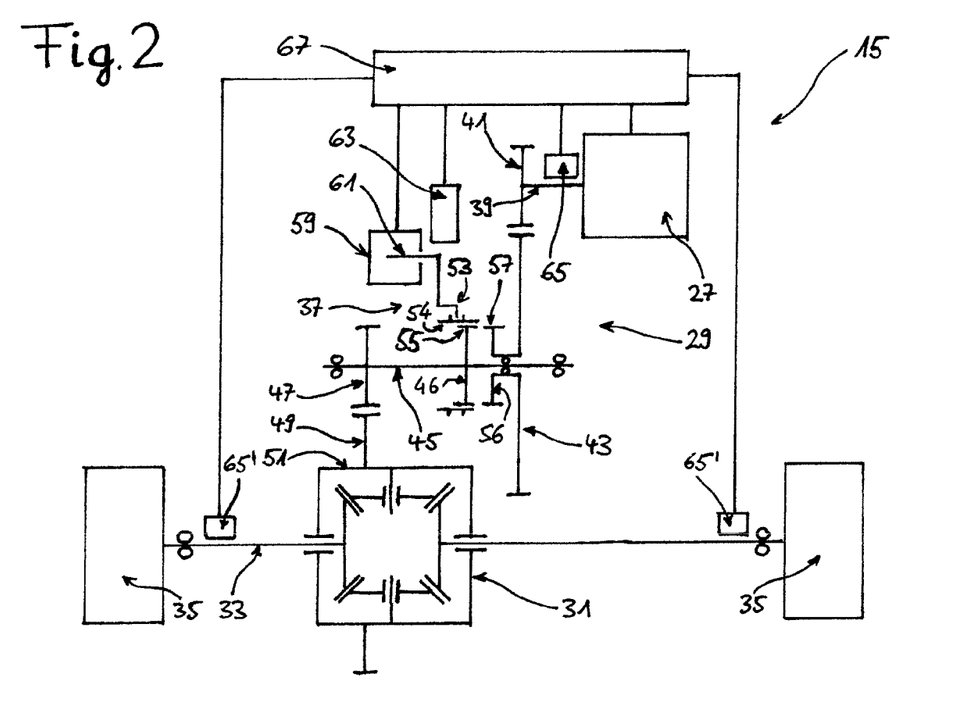
FIG. 2 illustrates a diagrammatic depiction of an embodiment of one of the drive trains from FIG. 1.

The diagrammatic depiction in FIG. 2 illustrates a drive train 15 with an electric motor 27, an intermediate gear mechanism 29 and a main gear mechanism designed as an axle differential 31. Wheels 35 are connected to the axle differential 31 via an axle 33. An output element 39 of the electric motor 27 is here designed as a shaft, which is connected rotationally fixedly to a first gear wheel 41. The first gear wheel 41 engages with a second gear wheel 43 which, in the present embodiment, is mounted rotatably on an intermediate shaft 45 and thus forms a moveable gear wheel. A third gear wheel 47 (fixed gear wheel) is connected rotationally fixedly to the intermediate shaft 45 and intermeshes with a fourth gear wheel 49. The fourth gear wheel 49 is connected rotationally fixedly to an input element 51 of the axle differential 31, wherein the input element 51 here constitutes the differential cage of the axle differential 31.

The intermediate gear mechanism 29 has a clutch 37 which is adapted to couple the second gear wheel 43 rotationally fixedly to the intermediate shaft 45. In the embodiment illustrated, the clutch 37 has a coupling element in the form of a sliding sleeve 53 which is mounted coaxial to and around the intermediate shaft 45, i.e. the intermediate shaft 45 forms a carrier element 46 for the sliding sleeve. To form a rotationally fixed connection, an inner toothing 54 of the sliding sleeve 53 intermeshes with an outer toothing 55 of the carrier element 46 (intermediate shaft 45). The sliding sleeve 53 is axially moveable so that it can also be brought into a positive-locking engagement with a counterpart toothing 57 of the second gear wheel 43, which thus forms a counterpart element 56 for the coupling element of the clutch 37 (sliding sleeve 53). The counterpart toothing 57 is here formed as an additional outer toothing of the second gear wheel 43.

The sliding sleeve 53 is moved via an electromagnetic actuator 59 which can change the position of the sliding sleeve 53 via an axially moveable tappet 61. The embodiment illustrated furthermore comprises a position sensor 63 which can detect the position of the clutch 37, and rotation speed sensors 65, 65' which can measure the rotation speed of the electric motor 27 and axle differential 31 respectively. In the embodiment illustrated, the rotation speed of the axle differential 31 is measured by two rotation speed sensors 65' which measure the respective rotation speeds of the wheels 35 on both sides of the axle differential 31, and from these measurements the rotation speed of the axle differential can be calculated. The position sensor 63 and the rotation speed sensors 65, 65' are connected to a control device 67 which receives the respective position signals and rotation speed signals and is able to control the electric motor 27 and the electromagnetic actuator 59 via corresponding connections.

Figure 3A:
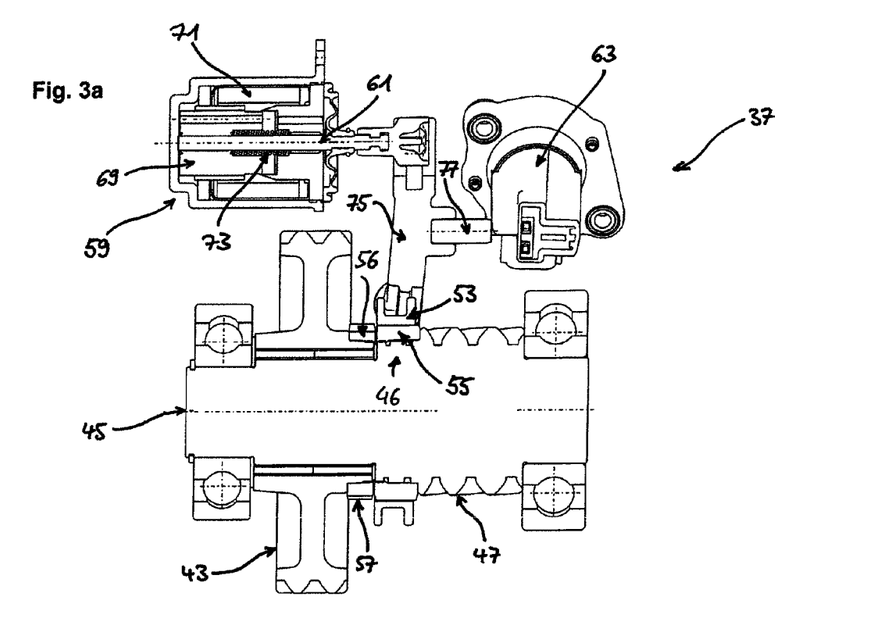
FIGS. 3a and 3b illustrates an embodiment of the clutch of the drive train for a motor vehicle in a longitudinal section, with the clutch in an open position and in a closed position.
Figure 3B:
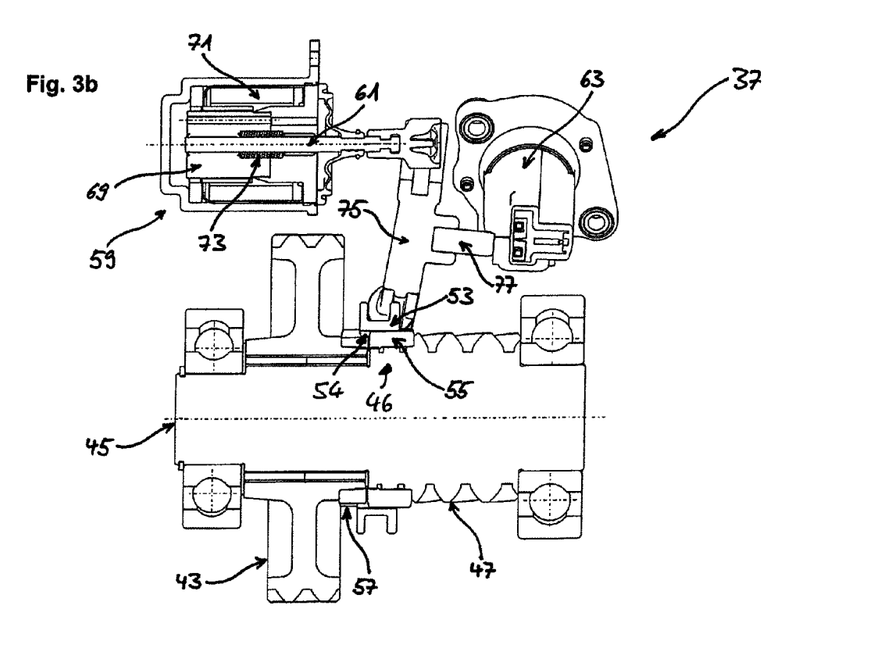

FIGS. 3a and 3b illustrate an embodiment of the clutch 37 of the drive train 15 in more detail in longitudinal section views, wherein FIG. 3a illustrates the clutch 37 in its open position and FIG. 3b illustrates the clutch 37 in its closed position. As well as the clutch 37, the intermediate shaft 45 and the second gear wheel 43 and the third gear wheel 47 are illustrated as further components of the intermediate gear mechanism 29. Whereas the second gear wheel 43 in FIG. 3a is mounted rotatably about the intermediate shaft 45, and in FIG. 3b is coupled rotationally fixedly to the intermediate shaft 45 by the clutch 37 in the closed position, the third gear wheel 47 is formed integrally with the intermediate shaft 45 and hence permanently connected rotationally fixedly to the intermediate shaft 45. The sliding sleeve 53 of the clutch 37 is formed as an internal ring gear, the inner toothing 54 of which engages with the outer toothing 55 of the intermediate shaft 45 and can be brought into engagement with the counterpart toothing 57 of the counterpart element 56, or of the second gear wheel 43, by axial movement.

The clutch is moved via the electromagnetic actuator 59 which comprises the tappet 61, which is connected to an armature 69 of the electromagnetic actuator 59. The electromagnetic actuator 59 also has an electromagnet 71, the magnetic field of which in connected state presses the armature 69 and the connected tappet 61 axially out of the electromagnetic actuator. A pretension device 73 between the armature 69 and the housing of the electromagnetic actuator 59 acts so that it presses the armature 69 and the connected tappet 61 into the electromagnetic actuator against the effect of the force of the electromagnet 71. The axial movement of the tappet 61 is translated via a linkage and a pivoting clutch fork 75 into an axial movement of the sliding sleeve 53, wherein the emergence of the tappet 61 from the electromagnetic actuator 59 leads to a closing movement i.e. to a coupling of the second gear wheel 43 to the intermediate shaft 45 (FIG. 3b). Conversely, the retraction of the tappet 61 into the electromagnetic actuator 59 leads to an opening movement of the sliding sleeve 53 (FIG. 3a). An extension 77 of the clutch fork 75 is arranged such that when the clutch 37 is in the closed position (FIG. 3b), said extension has contact with a position sensor 63, wherein this contact triggers the generation of a position signal corresponding to the closed position of the clutch 37, while the position sensor 63 otherwise emits a position signal corresponding to the open position of the clutch 37.

Figure 4A:
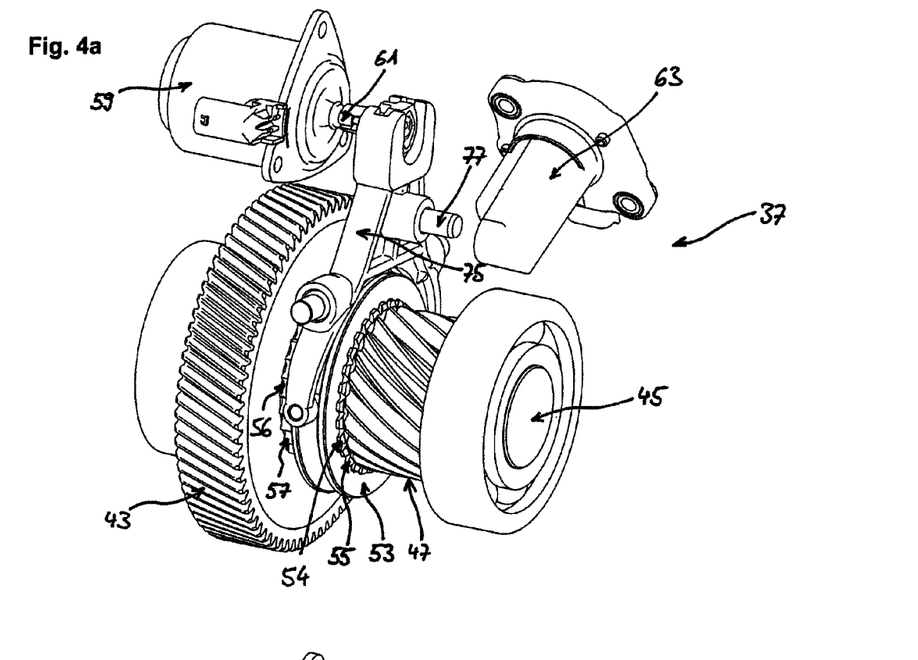
FIGS. 4a and 4b illustrates the clutch from FIGS. 3a and 3b in a perspective view.
Figure 4B:
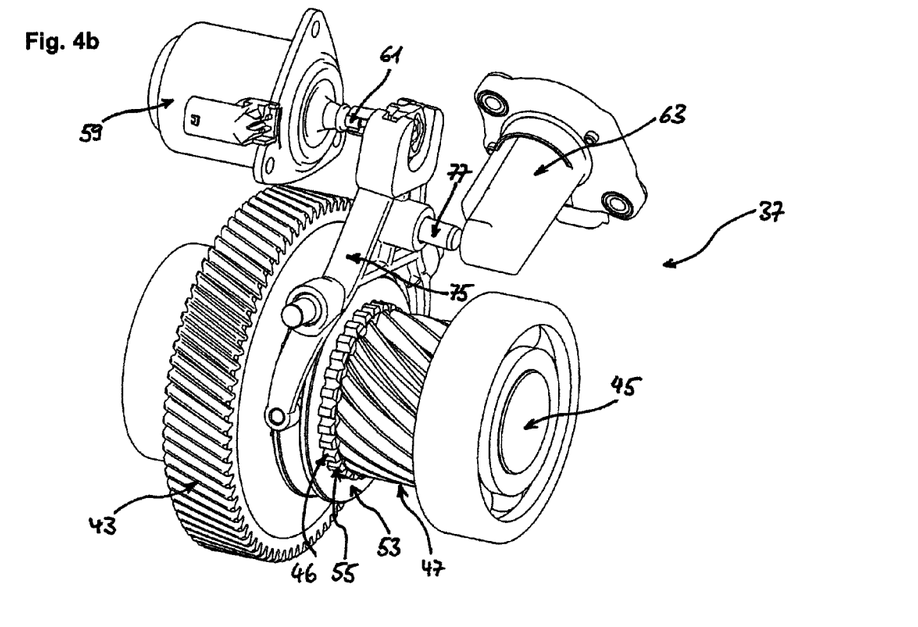

The same embodiment as illustrated in FIGS. 3a and 3b is illustrated in FIGS. 4a and 4b in a perspective view, wherein FIG. 4a (corresponding to FIG. 3a) illustrates the clutch 37 in its open position and FIG. 4b (corresponding to FIG. 3b) illustrates the clutch 37 in its closed position. The features of the embodiment marked with reference numerals and illustrates in FIGS. 4a and 4b correspond to those illustrated in FIGS. 3a and 3b. In particular, the perspective depiction in FIGS. 4a and 4b clearly illustrates the design of the clutch 37 as a sliding sleeve 53 with inner toothing 54 and the cooperation of the inner toothing 54 with the outer toothing 55 of the intermediate shaft 45 (carrier element 46) and with the counterpart toothing 57 of the second gear wheel 43 (counterpart element 56).

The figures illustrate a particularly preferred embodiment in which the clutch 37 is arranged as part of a drive train 15 in an intermediate gear mechanism 29 between an electric motor 27 and an axle differential 31. The clutch 37 may however also be used in totally different gear mechanisms and arrangements, not illustrated here.

LIST OF REFERENCE SIGNS

11 Motor vehicle
13 Drive train
15 Drive train
17 Internal combustion engine
19 Manual gear mechanism
21 Axle differential
23 Axle
25 Wheels
27 Electric motor
29 Intermediate gear mechanism
31 Main gear mechanism
33 Axle
35 Wheels
37 Clutch
39 Output element
41 First gear wheel
43 Second gear wheel
45 Intermediate shaft
46 Carrier element
47 Third gear wheel
49 Fourth gear wheel
51 Input element
53 Coupling element
54 Inner toothing
55 Outer toothing
56 Counterpart element
57 Counterpart toothing
59 Electromagnetic actuator
61 Tappet
63 Position sensor
65, 65' Rotation speed sensors
67 Control device
69 Armature
71 Electromagnet
73 Pretension device
75 Clutch fork
77 Extension

What is claimed is:

1. An electric drive axle for a hybrid vehicle including:
a positive locking clutch including:
    a gear wheel being rotatable about an axis and having counterpart toothing;
    an intermediate shaft being rotatable about the axis and presenting outer toothing;
    a coupling element disposed about the intermediate shaft and including inner toothing meshed with the outer toothing of the intermediate shaft and axially moveable between an engaged position and a disengaged positioned, wherein the inner toothing of the coupling element engages the counterpart toothing of the gear wheel when in the engaged positioned to rotationally connect the intermediate shaft and the gear wheel, and wherein the inner toothing of the coupling element disengages the counterpart toothing of the gear wheel when in the disengaged positioned to rotationally disconnect the intermediate shaft and the gear wheel;
    an actuator including a tappet being linearly moveable;
    a clutch fork including a base portion pivotably and axially connected to the tappet and including a pair of tines extending from the base portion in spaced relationship with one another and pivotably and axially connected to the coupling element on diametrically opposite sides of the coupling element for moving the coupling element between the engaged and disengaged positions in response to axial movement of the tappet;
    a pair of pivot pins each extending through one of the tines and into the coupling element for pivotably connecting one of the tines of the clutch fork to the coupling element; and
    a backlash provided between the inner toothing of the coupling element and the counterpart toothing of the gear wheel when the coupling element is in the engaged position.

2. An electric drive axle as set forth in claim 1, wherein the counterpart toothing of the gear wheel and the outer toothing of the intermediate shaft extend radially outwardly relative to the axis, and the inner toothing of the coupling element extends radially inwardly relative to the axis.

3. An electric drive axle as set forth in claim 1 wherein the clutch fork extends between a first end and a second end, and wherein the clutch fork is pivotably connected to the tappet adjacent to the first end and the clutch fork is pivotably connected to the coupling element adjacent to the second end.

4. An electric drive axle as set forth in claim 1, wherein the coupling element is rotationally fixed to the intermediate shaft and axially moveable relative to the intermediate shaft.

5. An electric drive axle as set forth in claim 1 wherein the gear wheel is disposed coaxially about the intermediate shaft.

6. An electric drive axle as set forth in claim 1 wherein the coupling element is disposed coaxially about the intermediate shaft.

7. An electric drive axle as set forth in claim 1 wherein the actuator is an electromagnetic actuator, and wherein the electromagnetic actuator further includes a pretension device biasing the tappet in the direction of the disengaged position of the coupling element.

8. An electric drive axle as set forth in claim 7, wherein the electromagnetic actuator further comprises includes an electromagnet and an armature being is linearly moveable relative to the electromagnet and coupled to the tappet for providing the movement of the tappet.

9. An electric drive axle as set forth in claim 1 further including an electric motor, wherein the gear wheel or the coupling element are rotatably driven by the electric motor, and further including a control device which is adapted to control the electric motor in order to bring a rotation speed of one of the gear wheel or coupling element closer to a rotation speed of the other of the gear wheel or the coupling element.

10. An electric drive axle as set forth in claim 9 further including at least one first rotation speed sensor configured to detect a rotational speed of the gear wheel and configured to generate a first rotation speed signal based on the detected rotational speed of the gear wheel, and further including at least one second rotation speed sensor configured to detect a rotational speed of the coupling element and configured to generate a second rotation speed signal based on the detected rotational speed of the coupling element, and wherein the control device is adapted to control at least one of the electromagnetic actuator and the electric motor as a function of the generated first and second rotation speed signals.

11. An electric drive axle as set forth in claim 1 further including a position sensor adapted to detect the position of the coupling element and generate a corresponding position signal, and a control device adapted to control the actuator based on the position signal generated by the position sensor.

12. An electric drive axle for a hybrid vehicle including:
a positive locking clutch including:
 a gear wheel being rotatable about an axis and having counterpart toothing;
 an intermediate shaft being rotatable about the axis and presenting outer toothing;
 a coupling element including inner toothing meshed with the outer toothing of the intermediate shaft and axially moveable between an engaged position and a disengaged positioned, wherein the inner toothing of the coupling element engages the counterpart toothing of the gear wheel when in the engaged positioned to rotationally connect the intermediate shaft and the gear wheel, and wherein the inner toothing of the coupling element disengages the counterpart toothing of the gear wheel when in the disengaged positioned to rotationally disconnect the intermediate shaft and the gear wheel;
 an actuator including a tappet being linearly moveable;
 a clutch fork pivotably connected to the tappet and pivotably connected to the coupling element for moving the coupling element between the engaged and disengaged positions in response to axial movement of the tappet;
 a backlash provided between the inner toothing of the coupling element and the counterpart toothing of the gear wheel when the coupling element is in the engaged position; and
 a position sensor, and an extension extending from the clutch fork in alignment with the position sensor and moveable with the clutch fork such that the extension is in abutting relationship with the position sensor when the coupling element is in the engaged position, and such that the extension is spaced from the position sensor when the coupling element is in the unengaged position.

13. An electric drive axle for a hybrid vehicle including:
a positive locking clutch including:
 a gear wheel being rotatable about an axis and having counterpart toothing;
 an intermediate shaft being rotatable about the axis and presenting outer toothing;
 a coupling element including inner toothing meshed with the outer toothing of the intermediate shaft and axially moveable between an engaged position and a disengaged positioned, wherein the inner toothing of the coupling element engages the counterpart toothing of the gear wheel when in the engaged positioned to rotationally connect the intermediate shaft and the gear wheel, and wherein the inner toothing of the coupling element disengages the counterpart toothing of the gear wheel when in the disengaged positioned to rotationally disconnect the intermediate shaft and the gear wheel;
 an actuator including a tappet being linearly moveable;
 a clutch fork pivotably connected to the tappet and pivotably connected to the coupling element for moving the coupling element between the engaged and disengaged positions in response to axial movement of the tappet;
 a backlash provided between the inner toothing of the coupling element and the counterpart toothing of the gear wheel when the coupling element is in the engaged position;
 an electric motor, wherein the gear wheel or the coupling element are rotatably driven by the electric motor, and further including a control device which is adapted to control the electric motor in order to bring a rotation speed of one of the gear wheel or coupling element closer to a rotation speed of the other of the gear wheel or the coupling element;
 at least one first rotation speed sensor configured to detect a rotational speed of the gear wheel and configured to generate a first rotation speed signal based on the detected rotational speed of the gear wheel, and at least one second rotation speed sensor configured to detect a rotational speed of the coupling element and configured to generate a second rotation speed signal based on the detected rotational speed of the coupling element, and wherein the control device is adapted to control at least one of the electromagnetic actuator and the electric motor as a function of the generated first and second rotation speed signals; and a position sensor adapted to detect the position of the coupling element and generate a corresponding position signal, and wherein the control device is adapted to control at least one of the electromagnetic actuator and the electric motor based on the position signal generated by the position sensor.

* * * * *